(12) United States Patent
Tramontano

(10) Patent No.: US 7,103,618 B1
(45) Date of Patent: Sep. 5, 2006

(54) DATA WAREHOUSE APPLICATIONS FOR NETWORKS OF SELF-SERVICE MACHINES

(75) Inventor: Robert J. Tramontano, Amersham (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/481,766

(22) Filed: Jan. 11, 2000

(30) Foreign Application Priority Data

Jan. 19, 1999 (GB) .................................. 9901005

(51) Int. Cl.
*G06F 17/30* (2006.01)

(52) U.S. Cl. ...................... 707/204; 707/200; 707/205; 707/10

(58) Field of Classification Search ........ 707/200–206, 707/100, 10, 3; 705/25, 40–43
See application file for complete search history.

(56) References Cited

U.S. PATENT DOCUMENTS

| | | | |
|---|---|---|---|
| 5,159,560 A | | 10/1992 | Newell et al. |
| 5,412,806 A | * | 5/1995 | Du .............................. 707/200 |
| 5,586,310 A | | 12/1996 | Sharman |
| 5,650,604 A | * | 7/1997 | Marcous et al. ............. 235/379 |
| 5,717,923 A | * | 2/1998 | Dedrick ........................ 707/10 |
| 5,749,079 A | * | 5/1998 | Yong et al. .................. 707/100 |
| 5,758,355 A | * | 5/1998 | Buchanan ................... 707/201 |
| 5,765,142 A | | 6/1998 | Allred et al. |
| 5,930,764 A | * | 7/1999 | Melchione .................... 705/10 |
| 5,940,843 A | * | 8/1999 | Zucknovich et al. ........ 707/516 |
| 6,016,501 A | * | 1/2000 | Martin et al. ................ 707/203 |
| 6,148,307 A | * | 11/2000 | Burdick et al. ............. 707/104 |
| 6,334,117 B1 | * | 12/2001 | Covert et al. .................. 705/43 |
| 6,505,177 B1 | * | 1/2003 | Drummond et al. .......... 705/43 |
| 6,587,857 B1 | * | 7/2003 | Carothers et al. ........... 707/102 |

FOREIGN PATENT DOCUMENTS

EP          0 843 291 A2    5/1988
WO        WO 97/15023        4/1997

OTHER PUBLICATIONS

Midrange Systems, vol. 9, No. 7, May 10, 1996, S. Dickey, "Mine your own Business", pp. 36-38, and also Dialog Accession No. 18295616.
Date C J: "Distributed Databases" Introduction to Database systems, Addison Wesley, US, vol. 2, 1983, pp. 291-340, XP002016220.
Date C J: "Distributed Systems" Introduction to Database Systems, Addison-Wesley, US, vol. 1, 1990, pp. 617-636, XP002318745.
"Turning Customer Data into Dollars" AT&T Technology, American Telephone & Telegraph Co. Short Hills, New Jersey, US, vol. 10, No. 4, 1995, pp. 19-23, XP002110887, ISSN: 0889-8979.

* cited by examiner

Primary Examiner—Cam Y T. Truong
(74) Attorney, Agent, or Firm—Michael Chan

(57) ABSTRACT

A network of interconnected self-service machines (SSMs), wherein each of the SSMs executes a relational database management system (RDBMS) that maintains a relational database stored on the SSM. The relational databases are partitions of a global relational database and each partition stores information for only those customers that frequent the SSM that executes the RDBMS. The relational databases are used to more effectively serve the customer at the SSM and to market products and services to the customer at the SSM.

5 Claims, 3 Drawing Sheets

DATA WAREHOUSE APPLICATIONS FOR NETWORKS OF SELF-SERVICE MACHINES

BACKGROUND OF THE INVENTION

1. Field of the Invention

The present invention relates to systems and methods of data warehousing applications, and in particular to data warehouse applications for networks of self-service machines (SSMs).

2. Description of the Related Art

Database management systems are used to collect, store, disseminate, and analyze data. Large-scale, integrated database management systems provide an efficient, consistent, and secure data warehouse capability for storing, retrieving, and analyzing vast amounts of data. This ability to collect, analyze, and manage massive amounts of information has become a virtual necessity in business today.

The information stored by these data warehouses can come from a variety of sources. One important data warehouse application involves the collection and analysis of information collected in the course of transactions between businesses and consumers. For example, when an individual uses a debit or credit card to access an automated teller machine (ATM) or purchase an item at a retail store, the identity of the customer, the transaction, and other related information are collected. Traditionally, this information is used only to determine if the transaction should be completed, and rarely for other purposes.

However, such data could also be used to identify demographic information concerning the customers and cross-sell other services and products. Unfortunately, the infrastructure of SSM networks does not support such uses of the information. Thus, there is a need in the art for mechanisms that allow for the exploitation of this information.

SUMMARY OF THE INVENTION

To overcome the limitations in the prior art described above, and to overcome other limitations that will become apparent upon reading and understanding the present specification, the present invention discloses a network of interconnected self-service machines (SSMs), wherein each of the SSMs executes a relational database management system (RDBMS) that maintains a relational database stored on the SSM. The relational databases are partitions of a global relational database and each partition stores information for only those customers that frequent the SSM that executes the RDBMS. The relational databases are used to more effectively serve the customer at the SSM and to market products and services to the customer at the SSM.

BRIEF DESCRIPTION OF THE DRAWING

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

System Description

Figure 1:
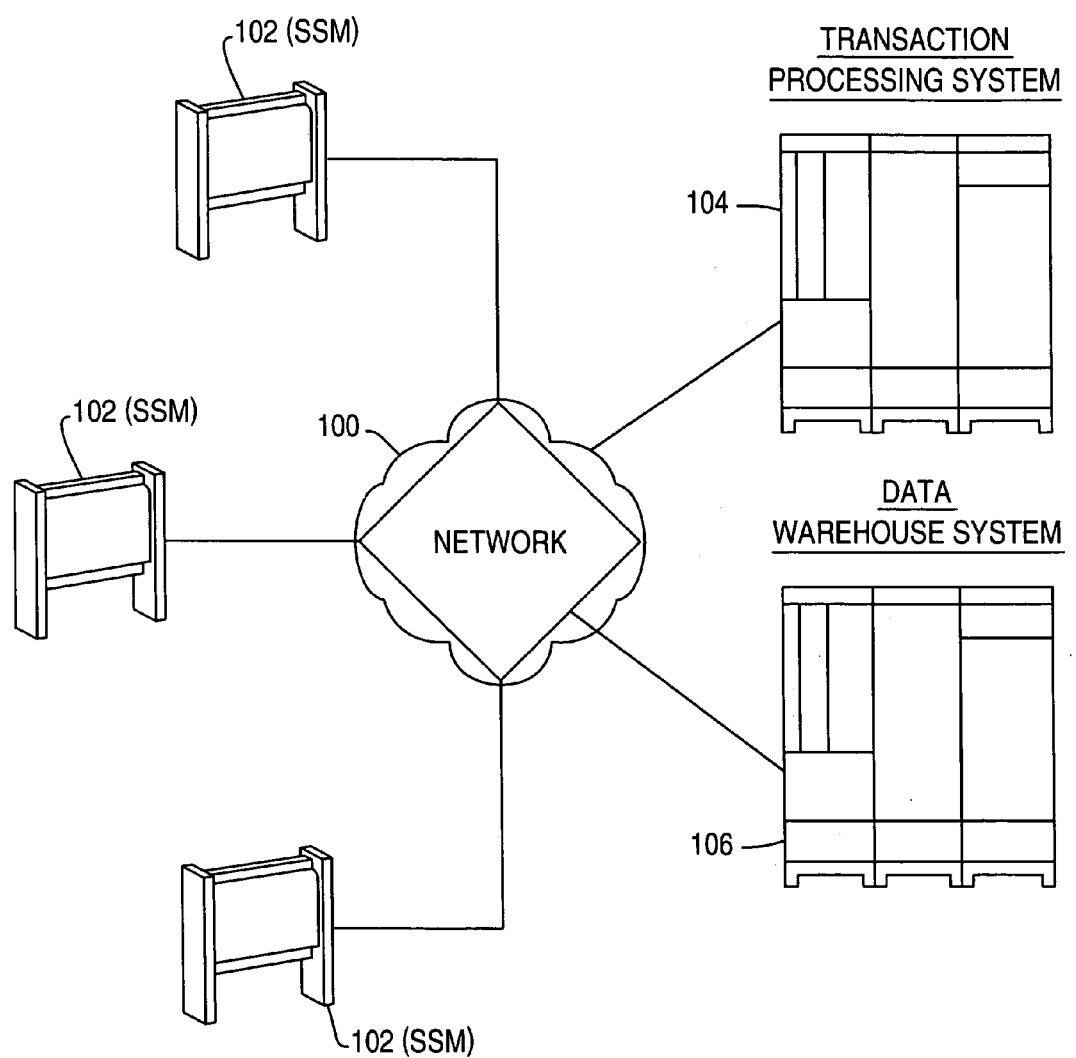
FIG. 1 illustrates an exemplary hardware environment that could be used to implement the preferred embodiment of the present invention.

FIG. 1 illustrates an exemplary hardware environment that could be used to implement the preferred embodiment of the present invention. In the exemplary environment, a network 100 interconnects a plurality of self-service machines (SSMs) 102, wherein the SSMs 102 may comprise automated teller machines (ATMs), computer-based retail kiosks, computer-based product vending machines, and the like. The network 100 also connects the SSMs 102 with one or more transaction processing systems 104 to process transactions, such as informational, retail, commercial, banking, financial or other transactions. One or more data warehouse systems 106 are also connected to the network 100 for communication with both the SSMs 102 or transaction processing systems 104, wherein the data warehouse system 106 collects, stores, analyzes, and disseminates information collected in the course of financial or commercial transactions between the SSMs 102 and the transaction processing system 104.

Figure 2:
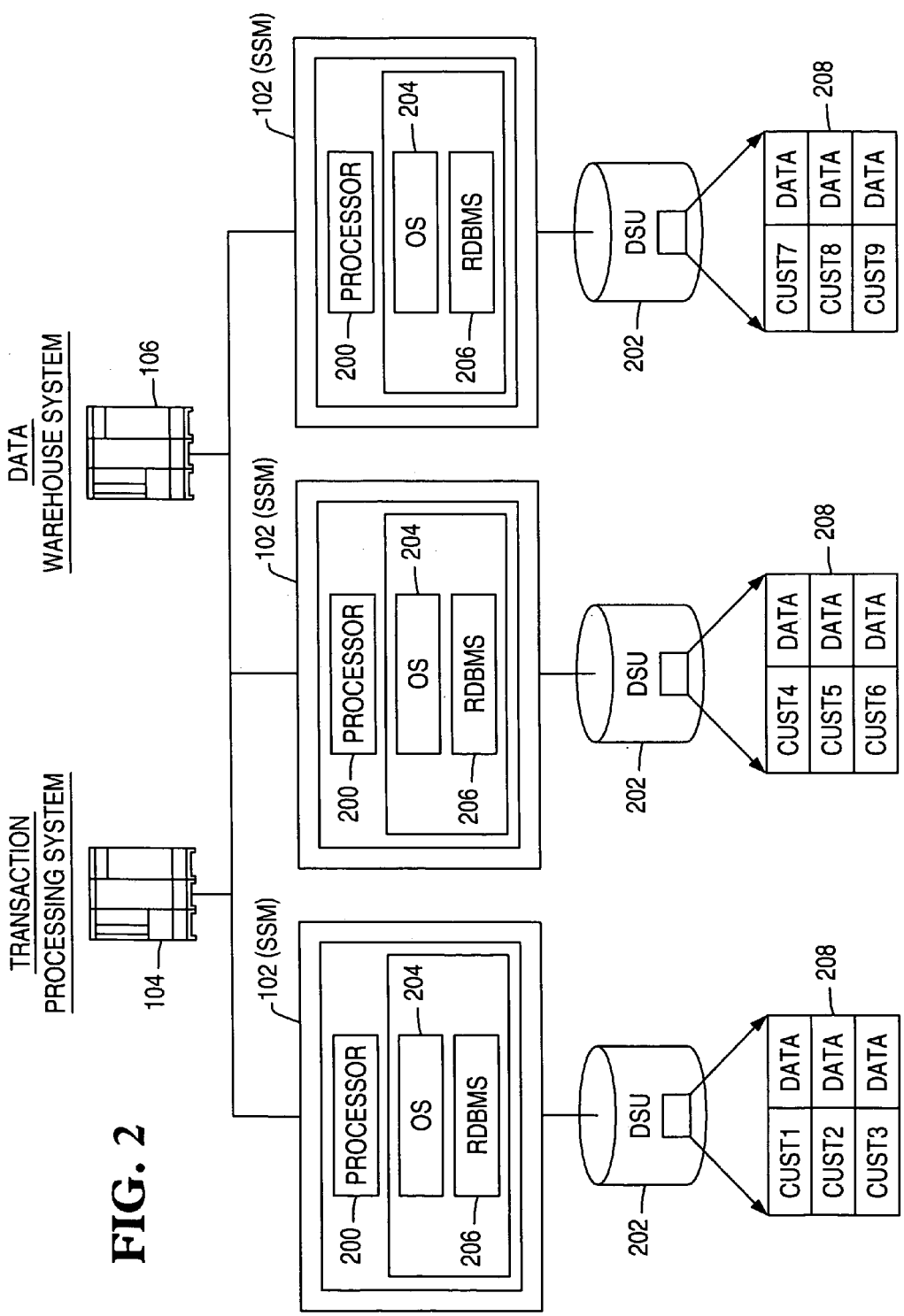
FIG. 2 further illustrates the exemplary hardware environment of FIG. 1.

FIG. 2 further illustrates the exemplary hardware environment of FIG. 1. In this illustration, each the SSMs 102 are shown to comprise one or more processors 200 coupled to one or more fixed and/or removable data storage units (DSUs) 202, such as disk drives, that store data and programming. Each of the SSMs 102 operate under the control of an operating system (OS) 204 and executes a relational database management system (RDBMS) 206 that maintains a relational database 208 stored on the DSUs 202.

SSMs 102 may be operated in large networks. For example, large financial institutions may have between 2,000 and 8,000 ATMs. These financial institutions also are beginning to build centralized data warehouse systems 106 in order to collect information about their customers and to use that information to increase propensity, profitability and customer satisfaction.

However, using a centralized data warehouse system 106 to provide information-rich customer interaction at SSMs 102 is currently prohibitive, since it would likely lengthen the amount of time involved in the SSM 102 transaction. For example, when using an SSM 102, a customer inserts their card into the SSM 102, their pin is validated locally within the SSM 102, a limited menu selection allows the customer to create the transaction request, and then the transaction request is transmitted to the transaction processing system 104 for authorization.

This idle time is ideal for cross-selling opportunities. If this idle time is only slightly increased to retrieve and display information for the customer, no harm is done. Unfortunately, if the idle time is substantially increased, or perceived to be increased, substantial harm may be done to the relationship with the customer.

Generally, the customer just wants to complete their transactions and leave. They are often unwilling to wait to absorb a cross-selling message after the transaction completes. Moreover, if the customer is forced to remain at the SSM 102 to receive the cross-selling message, the overall transaction time rises, the SSM 102 queue gets longer, and customer service is perceived to suffer.

The majority of SSM 102 customers are creatures of habit and interact with a small number of SSMs 102 at a small number of predictable locations for the majority of their transactions (this is especially true with ATMs, for example). As indicated in FIG. 2, many SSMs 102 comprise sophisticated computer systems; indeed, most will be based on sophisticated operating systems 204, such as WINDOWS NT™, within the next few years. As a result, more sophisticated customer-specific programming can be located at the SSMs 102 themselves rather than rely on access to the centralized data warehouse system 106 with its incumbent delays.

The preferred embodiment of the present invention essentially transforms the SSMs 102 into sophisticated platforms for RDBMS 206 applications that structure information, transactions, services, product offerings and the like based on the customer information maintained by the RDBMS 206. Moreover, the network 100 of interconnected SSMs 102 can be considered a massively parallel processor (MPP) computer system that operates parallelized RDBMS's 206. The basic intent of the present invention is to view the individual relational databases 208 as subsets or partitions of global relational database, and each of the individual RDBMS's 206 as comprising part of a global RDBMS.

In the preferred embodiment of the present invention, the OS 204 comprises the WINDOWS NT™ product offered by Microsoft Corporation, although other OS's could be used as well. Moreover, in the preferred embodiment of the present invention, the RDBMS 206 software comprises the Teradata® product offered by NCR Corporation, which is designed specifically for operation on MPP computer systems, although other RDBMS's could be used as well.

The global relational database is divided among the SSMs 102 by storing customer-specific information at specific SSMs 102. Thus, each DSU 202 stores a subset of the global relational database and operations can be performed either locally or globally. In the preferred embodiment, the subset includes information on those customers that frequent the particular SSM 102.

Because the information is stored locally on the SSM 102, the SSM 102 is capable of using information about the customer, at the point of interaction, to more effectively serve the customer, to provide personalized service, as well as to market products and services to the customer. Moreover, because the RDBMS 206 is a standard software product, it is available to other SSMs 102 or other systems on the network 100.

It is one goal of the present invention to parallelize functions across the SSMs 102. For example, queries or other operations can be divided into smaller sub-queries, each of which can be assigned to an SSM 102 based on the specific information stored on the SSMs 102. Alternatively, specific operations on particular information can be directed to an SSM 102 storing the particular information.

In essence, the present invention decentralizes the centralized data warehouse system 106 to the network 100 of SSMs 102. Note that the network 100 of SSMs 102 may or may not be considered the primary data warehouse system; it may be just a duplicate or back-up of the data warehouse system 106. Moreover, the SSMs 102 and the centralized data warehouse system 106 could be synchronized at night or during other low usage periods. Further, the SSMs 102 may synchronize or move data among each other as required.

The SSMs 102 may also capture detailed data about the customer's interaction (screens viewed, information presented, dwell time, and transaction information, if any) for use both locally and globally. This detailed data could be uploaded to populate the centralized data warehouse system 106 or copied to another SSM 102.

Based on customer usage patterns as determined by the data warehouse system 106, data may be stored on multiple SSMs 102 or moved among SSMs 102 as required. Generally, customer usage patterns are fairly constant, and thus only a minimal amount of data is moved at any time.

Such a system ties together the SSMs 102 and the centralized data warehouse system 106 in interesting and powerful ways. It demonstrates the leverage and utilization that can be applied to a generally underutilized SSM 102 infrastructure. Moreover, it provides a foundation for more sophisticated applications.

Logic of the Data Warehouse System

Figure 3:
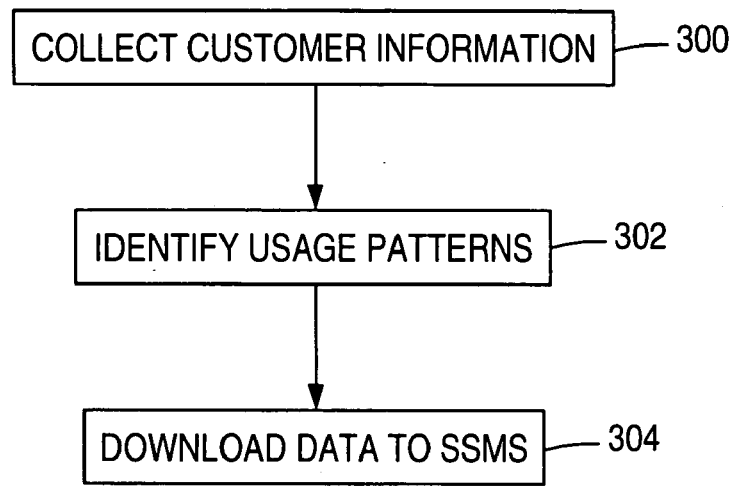
FIG. 3 illustrates the logic performed by the data warehouse system according to the preferred embodiment of the present invention.

FIG. 3 illustrates the logic performed by the data warehouse system 106 according to the preferred embodiment of the present invention.

Block 300 represents the data warehouse system 106 collecting information from the SSMs 102 and/or the transaction processing systems 104 in the course of financial or commercial transactions between the SSMs 102 and the transaction processing systems 104.

Block 302 represents the data warehouse system 106 analyzing the collected information to identify the locations at which specific customers interact with the SSMs 102.

Block 304 represents the data warehouse system 106 downloading customer-specific information to the identified SSMs 102. This step may also include downloading customer-specific information retrieved from the transaction processing system 104.

Logic of the Automated Teller Machine

Figure 4:
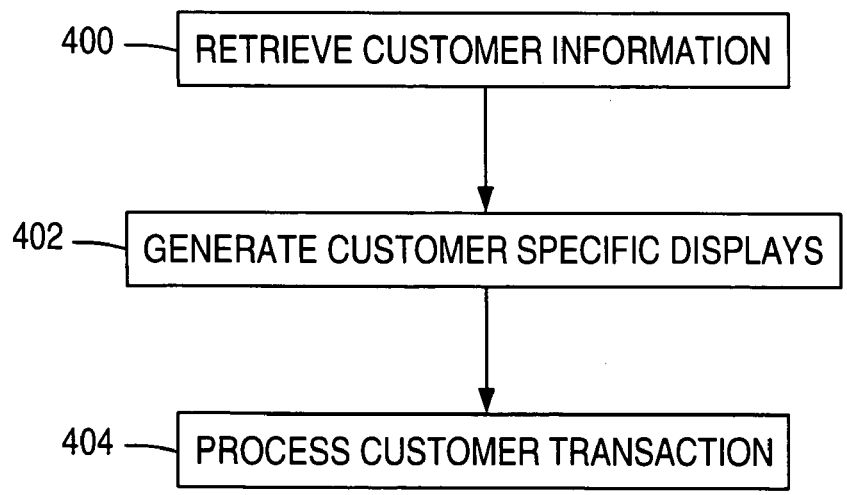
FIG. 4 illustrates the logic performed by the self-service machines according to the preferred embodiment of the present invention.

FIG. 4 illustrates the logic performed by the SSMs 102 according to the preferred embodiment of the present invention.

Block 400 represents the SSM 102 retrieving customer-specific information from the relational database 208 stored on the SSMs 102. This information can be retrieved at any time after the customer is identified by the SSM 102. Alternatively, this step my require the retrieval of customer-specific information from the transaction processing system 104, the data warehouse system 106, or one or more of the other SSMs 102, especially if the SSM 102 is not one frequented by the customer. The customer-specific information is used to more effectively serve the customer, to provide personalized service, as well as market products and services to the customer.

Block 402 represents the SSM 102 generating a customer-specific display on the SSM 102. This step may be performed before or after any customer interaction (after the customer has been identified, of course). This step may also be performed during any idle time while the customer is waiting for completion of a transaction or information request. The goal is not to increase the amount of time it takes for the transaction to complete.

Block 404 represents the SSM 102 processing a customer transaction or request. For example, this step may include accepting a request for information, services, or products from the customer into the SSM 102, validating the transaction (either locally or remotely via the transaction processing system 104), presenting additional menu selections, and then communicating with the transaction processing system 104 to complete the transaction.

CONCLUSION

This concludes the description of the preferred embodiment of the invention. The following describes an alternative embodiment for accomplishing the same invention. In one alternative embodiment, any type of computer or network could be used to implement the present invention. In addition, any database management system could benefit from the present invention.

In summary, the present invention discloses a network of interconnected automated teller machines (SSMs), wherein each of the SSMs executes a relational database management system (RDBMS) that maintains a relational database stored on the SSM. The relational databases are partitions of a global relational database and each partition stores information for only those customers that frequent the SSM that executes the RDBMS. The relational databases are used to more effectively serve the customer at the SSM and to market products and services to the customer at the SSM.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of operating a system of automated teller machines (ATMs) to store at each ATM information about a sub-set of customers to allow the ATM to more effectively serve its sub-set of customers, the method comprising:

maintaining a first relational database at a first ATM, wherein the first relational database stores information about a first sub-set of customers who frequent the first ATM to conduct transactions at the first ATM;

maintaining a second relational database at a second ATM, wherein the second relational database stores information about a second sub-set of customers, different from the first sub-set of customers, and who frequent the second ATM to conduct transactions at the second ATM;

collecting in a data warehouse customer information from transactions conducted at the first and second ATMs;

determining first customer information based upon customer information collected in the data warehouse and relating to transactions conducted by the first sub-set of customers at the second ATM;

determining second customer information based upon customer information collected in the data warehouse and relating to transactions conducted by the second sub-set of customers at the first ATM;

transmitting the first customer information from the data warehouse to the first ATM to allow the first ATM to update the information about the first sub-set of customers stored in the first relational database to include the first customer information and thereby to allow the first ATM to more effectively serve the first sub-set of customers at the first ATM whenever the first sub-set of customers conduct future transactions at the first ATM; and transmitting the second customer information from the data warehouse to the second ATM to allow the second ATM to update the information about the second sub-set of customers stored in the second relational database to include the second customer information and thereby to allow the second ATM to more effectively serve the second sub-set of customers at the second ATM whenever the second sub-set of customers conduct future transactions at the second ATM.

2. A method according to claim 1, further comprising:

capturing detailed data about a customer's interaction for use both locally at the particular ATM and globally at the data warehouse.

3. A method of operating a system of automated teller machines (ATMs) to store at each ATM information about a sub-set of customers to allow the ATM to more effectively serve its sub-set of customers, the method comprising:

maintaining a first relational database at a first ATM, wherein the first relational database stores information about a first sub-set of customers who frequent the first ATM to conduct transactions at the first ATM;

maintaining a second relational database at a second ATM, wherein the second relational database stores information about a second sub-set of customers, different from the first sub-set of customers, and who frequent the second ATM to conduct transactions at the second ATM;

collecting in a data warehouse customer information from transactions conducted at the first and second ATMs; and synchronizing customer information between the data warehouse and each of the first and second ATMs to (i) update the information about the first sub-set of customers stored in the first relational database to include certain customer information which has been collected in the data warehouse and thereby to allow the first ATM to more effectively serve the first sub-set of customers at the first ATM whenever the first sub-set of customers conduct future transactions at the first ATM, and (ii) update the information about the second sub-set of customers stored in the second relational database to include other certain customer information which has been collected in the data warehouse and thereby to allow the second ATM to more effectively serve the second sub-set of customers at the second ATM whenever the second sub-set of customers conduct future transactions at the second ATM.

4. A system of automated teller machines (ATMs) which stores at each ATM information about a sub-set of customers to allow the ATM to more effectively serve its sub-set of customers, the system comprising:

means for maintaining a first relational database at a first ATM, wherein the first relational database stores information about a first sub-set of customers who frequent the first ATM to conduct transactions at the first ATM;

means for maintaining a second relational database at a second ATM, wherein the second relational database stores information about a second sub-set of customers, different from the first sub-set of customers, and who frequent the second ATM to conduct transactions at the second ATM;

means for collecting in a data warehouse customer information from transactions conducted at the first and second ATMs;

means for determining first customer information based upon customer information collected in the data warehouse and relating to transactions conducted by the first sub-set of customers at the second ATM;

means for determining second customer information based upon customer information collected in the data warehouse and relating to transactions conducted by the second sub-set of customers at the first ATM;

means for transmitting the first customer information from the data warehouse to the first ATM to allow the first ATM to update the information about the first sub-set of customers stored in the first relational database to include the first customer information and thereby to allow the first ATM to more effectively serve the first sub-set of customers at the first ATM whenever the first sub-set of customers conduct future transactions at the first ATM; and means for transmitting the second customer information from the data warehouse to the second ATM to allow the second ATM to update the information about the second sub-set of customers stored in the second relational database to include the second customer information and thereby to allow the second ATM to more effectively serve the second sub-set of customers at the second ATM whenever the second sub-set of customers conduct future transactions at the second ATM.

5. A system of automated teller machines (ATMs) which stores at each ATM information about a sub-set of customers to allow the ATM to more effectively serve its sub-set of customers, the system comprising:

means for maintaining a first relational database at a first ATM, wherein the first relational database stores information about a first sub-set of customers who frequent the first ATM to conduct transactions at the first ATM;

means for maintaining a second relational database at a second ATM, wherein the second relational database stores information about a second sub-set of customers, different from the first sub-set of customers, and who frequent the second ATM to conduct transactions at the second ATM;

means for collecting in a data warehouse customer information from transactions conducted at the first and second ATMs; and means for synchronizing customer information between the data warehouse and each of the first and second ATMs to (i) update the information about the first sub-set of customers stored in the first relational database to include certain customer information which has been collected in the data warehouse and thereby to allow the first ATM to more effectively serve the first sub-set of customers at the first ATM whenever the first sub-set of customers conduct future transactions at the first ATM, and (ii) update the information about the second sub-set of customers stored in the second relational database to include other certain customer information which has been collected in the data warehouse and thereby to allow the second ATM to more effectively serve the second sub-set of customers at the second ATM whenever the second subset of customers conduct future transactions at the second ATM.

* * * * *